May 20, 1941.  I. GORDON  2,242,705
WATER SPRAYING AIRPLANE
Filed Feb. 6, 1939
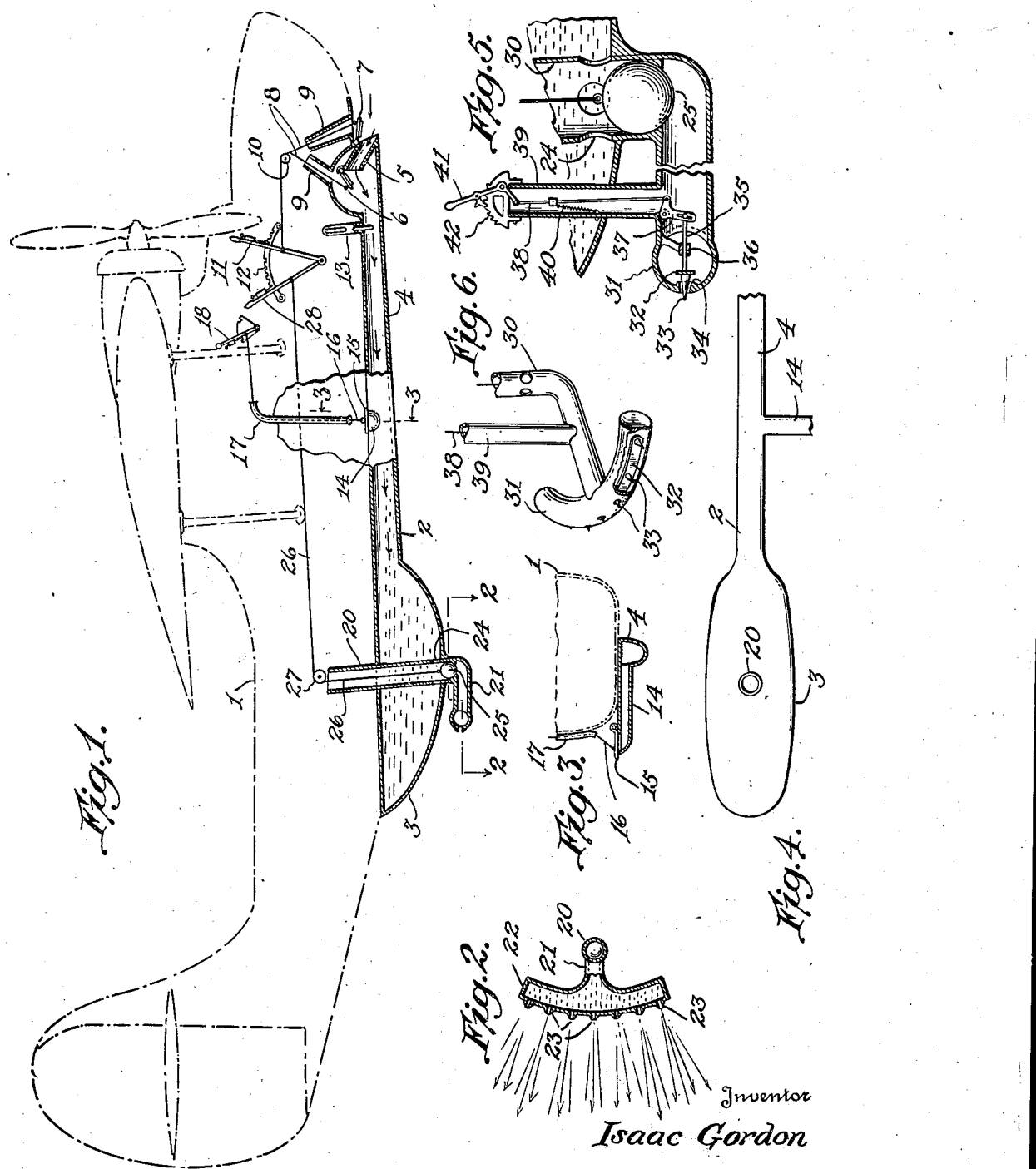
Inventor
Isaac Gordon Patented May 20, 1941

2,242,705

UNITED STATES PATENT OFFICE 2,242,705

WATER SPRAYING AIRPLANE

Isaac Gordon, Schenectady, N. Y.

Application February 6, 1939, Serial No. 254,926

12 Claims. (Cl. 244—136)

This invention relates to airplanes of either the type capable of landing on water or those provided with gear for landing on the ground, as well as amphibian planes. The primary object of the invention resides in the provision of such planes with a tank for carrying a capacity load of water either for the purpose of irrigating the land or for extinguishing fires in buildings, forests, etc.

A further object of the invention resides in so designing and placing the tank that it will not only serve as a reinforcement of the airplane but will also maintain the balance of the plane in "taking off" and landing.

Another object of the invention consists in providing a sea plane of this general combination with means whereby the tank may be automatically charged or loaded as the plane travels through the water.

A further object of the invention resides in the provision of a spraying mechanism associated with the tank and simplified means for controlling the spraying of the water.

Another object of the invention consists in the provision of valves for controlling the entrance and exit of water to and from the tank, and readily accessible means for manually operating the same.

Other objects and advantages of the invention will be apparent from the following description when taken in connection with the accompanying drawing, in which, Figure 1 is a side view, in dotted outline, of a sea plane with the water tank shown in vertical section.

Figure 2 is a horizontal sectional view through the spraying device, taken on line 2—2 of Figure 1.

Figure 3 is a fragmentary sectional view through the means for charging the tank when at a standstill on a body of water, taken on line 3—3 of Figure 1.

Figure 4 is a fragmentary plan view of the tank removed from the plane.

Figure 5 is a vertical sectional view of a modified construction of a spraying mechanism suitable for spraying by airplane, together with controls therefor, and Figure 6 is a fragmentary perspective view of the spray nozzle of Figure 5.

Referring to the drawing in more detail and particularly to Figure 1, the numeral 1 indicates generally a sea plane shown in dotted outline, but it is to be understood that this showing is intended only as illustrative of the invention and that the invention is equally well adaptable to land planes and amphibian planes. Forming the base of the sea plane is a tank 2, which is shown in plan view in Figure 4.

The body of the tank is more or less elongated in a horizontal direction, and is relatively wide and deep at its rear end and long and narrow in a forward direction, as indicated by numerals 3 and 4 respectively. This designing of the tank of course is for the purpose of providing proper balance for the plane, and since it forms a part of the plane body, serves to reinforce the latter.

The forward end of the neck 4 of the tank is provided with an upwardly and inwardly inclined charging spout or funnel 5, and spring-pressed closures 6 and 7 are provided for cooperation with the opposite ends of the spout. These closures are normally maintained closed by spring hinges, but may be opened against the pressure of the springs by chains or cords 8 extending upwardly through tubes 9. The cords 8 preferably pass over a guide pulley 10 and are connected to a hand lever 11 associated with a ratchet segment 12. It will be apparent therefore that the closures at the charging end of the tank may be readily opened or closed by the pilot of the plane by simple operation of lever 11 which is located adjacent the pilot's seat. A water gauge 13 provides a convenient means for indicating when the tank is filled.

When it is desired to take on a load of water this may be done while the plane is traveling at high speed if there is a body of water available of sufficient size for that purpose. In such event the pilot merely operates lever 11 to allow the closures to open when the plane contacts the water, and then operates the lever in a direction to close the members 6 and 7 when the tank is full as will be indicated by the gauge 13. In a land plane the same charging of the tank could be performed by running the plane along an elongated water trough with the wheels of the plane straddling the trough.

If there is no body of water available of sufficient size to permit high speed travel of the plane over its surface, then the tank may be filled by landing on its surface and allowing the water to pass into the tank through spout 5 and through an auxiliary inlet 14 extending laterally from the narrow neck portion of the tank. This auxiliary inlet, which is provided with a spring closure 15, is also useful in filling the tank of land planes. This closure may be moved to open position by means of a chain or cord 16 extending upwardly through a guide tube 17 on the exterior of the plane body and connected to a manually operated lever 18 similar to lever 11 heretofore described.

The spraying mechanism of course is located adjacent the rear end of the tank and comprises a more or less L-shaped tube having its longer arm 20 extending upwardly through the tank and its shorter arm 21 positioned below the tank and directed rearwardly. The tube 21 terminates in an arcuate spray nozzle 22 provided with a plurality of jets 23 through which fine streams of water may be discharged.

The longer tube 20 is provided with a plurality of inlet openings 24 just above the bottom of tank 3 to permit water to enter this tube and descend into the spray nozzle 22. The lower end of tube 20 is provided with a valve seat for cooperation with a ball valve 25 and a cord or chain 26 is connected to the ball valve for opening the same. The cord extends over a guide pulley 27, and is connected with a manually-operated lever 28 associated with a ratchet segment 12. It will be apparent therefore that when the plane reaches the position where it is desired to irrigate the land or extinguish a fire it is only necessary for the operator to move the lever 28 in a direction to raise the valve 25 above the openings 24 so that the water may discharge through the openings into tube 21 and thence through the jets 23. The rate of discharge will of course vary with the extent of opening of the valve.

In Figures 5 and 6 is shown a modified construction of spray nozzle in which a valve arrangement is associated with the jets so as to vary the rate of discharge therefrom. The L-shaped tube is indicated by the numeral 30 and has its longer arm provided with openings and with a ball valve just as in the form shown in Figure 1. In the arcuate spray nozzle 31 however a coextensive arcuate plate 32 is mounted and is provided with a plurality of cone-shaped valves 33 adapted to cooperate with the inwardly-directed valve seats 34 formed in the spray nozzle 31. The plate 32 is fixed on a rod 35 which is slidably mounted in a bearing 36 and which has its opposite end associated with a slot in one arm of a bell-crank lever 37. The other arm of the bell-crank is connected to a rod 38 extending upwardly through a tube 39 connected to tube 30, and a tension spring 40 has its respective ends connected to the rod and tube so as to bias the valves 33 toward closed position. A manually operated lever 41 is connected to the upper end of rod 38 and cooperates with a ratchet segment 42 to lock the lever in adjusted position. By variously positioning the lever 41 the valves 33 may be fully opened or fully closed or may be placed in any intermediate position. Also, instead of locating the operating lever at the upper end of tube 39 it could be readily placed in any preferred position by interposing suitable gearing.

From the foregoing description it will be observed that I have devised a simplified construction of airplane and water tank in which the tank is designed to reinforce the plane structure and is so shaped and positioned as to avoid throwing the plane out of balance; that means are provided for charging the tank while at a standstill or while traveling through the water at high speed; that means are provided for discharging the water at a desired rate; and that all of the mechanisms may be conveniently operated by the pilot from his usual position in the plane.

In accordance with the patent statutes I have described what I now believe to be the preferred construction of the apparatus but inasmuch as various minor changes may be made in the details of construction without departing from the spirit of the invention it is intended that all such details be included within the scope of the appended claims.

What is claimed is:

1. An aerial water spraying apparatus including an airplane having a hull and a water tank forming a part of the bottom of the hull of the plane and located entirely below the water line thereof, said tank having its major capacity at the rear of the plane and tapered toward the front of the plane, the forward end of the tank provided with an opening for charging the tank as the plane moves over a body of water.

2. An aerial water spraying apparatus including an airplane having a hull and a water tank forming a part of the bottom of the hull of the plane and located entirely below the water line thereof, said tank having its major capacity at the rear of the plane and tapered toward the front of the plane, the forward end of the tank provided with an opening for charging the tank as the plane moves over a body of water, and a closure for said opening.

3. An aerial water spraying apparatus including an airplane having a hull and a water tank forming a part of the bottom of the hull of the plane and located entirely below the water line thereof, said tank extending longitudinally of the plane and provided with an upwardly and inwardly directed filling nozzle at its forward end for charging the tank as the plane moves over a body of water, and oppositely opening closures for the inner and outer ends of said nozzle.

4. An aerial water spraying apparatus including an airplane having a hull and a water tank forming a part of the bottom of the hull of the plane and located entirely below the water line thereof, said tank extending longitudinally of the plane and provided with an upwardly and inwardly directed filling nozzle at its forward end for charging the tank as the plane moves over a body of water, oppositely opening closures for the inner and outer ends of said nozzle, and means for simultaneously operating said closures.

5. An aerial water spraying apparatus including an airplane having a hull and a water tank forming a part of the bottom of the hull of the plane and located entirely below the water line thereof, a spraying nozzle communicating with the bottom of the tank adjacent its rear end, and a valve for controlling communication between said tank and nozzle.

6. An aerial water spraying apparatus including an airplane and a water tank extending longitudinally of the body of the plane, a spraying nozzle provided with a plurality of jets communicating with the bottom of the tank adjacent its rear end, a ball valve for controlling communications between the tank and nozzle, a cord for operating the valve and a lever adjacent the front of the plane for operating the cord.

7. An aerial water spraying apparatus including an airplane and a water tank extending longitudinally of the body of the plane, an L-shaped tube having its longer arm extending substantially vertically through the tank, said arm having one or more openings in its wall to permit communication with the tank, the shorter arm of the tube extending exteriorly of the tank, and a spray nozzle on said shorter arm.

8. An aerial water spraying apparatus including an airplane and a water tank extending longitudinally of the body of the plane, an L-shaped tube having its longer arm extending through the tank and in communication with the interior of the tank, the shorter arm of the tube extending exteriorly of the tank, a spraying nozzle on said shorter arm, a valve for controlling communication between the two arms of said tube, and valve-operating means extending upwardly through the longer arm of the tube.

9. An aerial water spraying apparatus including an airplane and a water tank extending longitudinally of the body of the plane, an L-shaped tube having its longer arm extending substantially vertically through the tank and in communication with the interior of the tank, the shorter arm of the tube extending exteriorly of the tank, a multiple jet spray nozzle connected with the shorter arm of the tube, valves for said jets, and means for simultaneously operating all of said valves.

10. An aerial water spraying apparatus including an airplane having a hull and an elongated water tank extending horizontally along the bottom of the airplane hull below the water line thereof, a charging nozzle at the forward end of the tank and a spraying nozzle at the rear end of the tank.

11. An aerial water spraying apparatus including an airplane having a hull and a horizontally elongated water tank connected therewith and located entirely below the water line of the airplane, a charging nozzle situated at the top of the tank, and a spraying nozzle located at the bottom of the tank.

12. An aerial water spraying apparatus including an airplane having a hull and a horizontally elongated water tank forming a part of the bottom of the hull of the plane and located entirely below the water line thereof, an upwardly opening charging nozzle situated at the top of the tank, and a spraying nozzle located at the bottom of the tank.

ISAAC GORDON.